United States Patent
Zheng

(10) Patent No.: US 6,575,422 B1
(45) Date of Patent: Jun. 10, 2003

(54) FOLDABLE FRAME

(76) Inventor: Edward Zheng, 1736 Wright Ave., La Verne, CA (US) 91750

( * ) Notice: Subject to any disclaimer, the term of this patent is extended or adjusted under 35 U.S.C. 154(b) by 0 days.

(21) Appl. No.: 09/738,511

(22) Filed: Dec. 18, 2000

(51) Int. Cl.[7] .............................................. F16M 11/38
(52) U.S. Cl. ...................... 248/436; 108/118; 108/128; 248/166
(58) Field of Search ................................ 248/436, 164, 248/166, 169, 170, 188.6, 168, 188.8; 297/16.2, 45, 397, 57, 59; 108/118, 124, 127, 128

(56) References Cited

U.S. PATENT DOCUMENTS

| 476,805 | A | * | 6/1892 | Mason | 108/128 |
| 1,157,795 | A | * | 10/1915 | Mix | 108/128 |
| 1,390,836 | A | * | 9/1921 | Stoll | 108/128 |
| 3,136,272 | A | * | 6/1964 | Sprigman | 108/118 |
| 3,235,215 | A | * | 2/1966 | Lodde, Jr. | 248/161 |
| 3,282,530 | A | * | 11/1966 | Rash | 242/127 |
| 6,382,715 | B1 | * | 5/2002 | Tang | 297/16.2 |

* cited by examiner

*Primary Examiner*—Ramon O. Ramirez
*Assistant Examiner*—Tan Le
(74) *Attorney, Agent, or Firm*—Raymond Y. Chan; David and Raymond Patent Group

(57) ABSTRACT

A foldable frame for supporting a fabric thereon includes at least three pairs of frame legs each of which comprises a pair of first and second frame legs pivotally connected together where the first and second frame legs cross, an upper frame joint for pivotally connecting top ends of the first frame legs, a lower frame joint for pivotally connecting lower ends of the second frame legs wherein the lower frame joint is positioned below and aligning with the upper frame, and a coupling joint including a slider axle slidably connected between the upper and lower frame joints, a tubular holder affixed on the slider axle between the upper and lower frame joints, and a locker means affixed to the lower frame joint wherein the locker means is adapted for rotatably engaging with the tubular holder in order to lock up the lower frame joint on the slider axle and adjust a distance between the upper and lower frame joints, so as to regulate the tension of the fabric.

12 Claims, 6 Drawing Sheets

FOLDABLE FRAME

BACKGROUND OF THE PRESENT INVENTION

1. Field of Invention

The present invention relates to folding furniture, and more particularly to a foldable frame which is adapted for selectively adjusting the extension of the foldable frame so as to regulate the tension of the supporting fabric.

2. Description of Related Arts

Referring to FIG. 1, a conventional foldable frame for supporting a fabric thereon, such as foldable table or foldable leg rest supporting frame, is constructed by metal tubes wherein the foldable frame comprises a plurality of construction tubes pivotally connected together wherein they cross so that the foldable frame can be easily unfolded to provide a rigid cross-support for use and be folded up for storage.

Because such a conventional foldable frame can be quickly and easily unfolded for use and folded into a compact unit for carriage, a user can carry the foldable frame such as foldable table to everywhere such as campground or beach. However, when the user puts an object on the fabric which is supported by the foldable frame, due to the weight of the object, the tension of the fabric is not stretched enough to well support the object thereon. This causes the fabric to be distorted and misshapen so as to provide an unbalanced supporting surface of the fabric.

In other words, the stress on the fabric has simply been transferred to a downward pulling force on the fabric. As a result, the foldable frame tends to fold up and the object will not be substantially supported on the fabric. So, the foldable frame fails to well support the object on the fabric.

SUMMARY OF THE PRESENT INVENTION

A main object of the present invention is to provide a foldable frame for supporting a fabric thereon wherein the foldable frame can well support a downward pulling force applied on the fabric in such a stable manner.

Another object of present invention is to provide a foldable frame which can substantially increase the tension of the fabric to distribute and support the downward pulling force and stress.

Another object of the present invention is to provide a foldable frame which is adapted for selectively adjusting the tension of the fabric to enhance an object on the fabric in a state of balance.

Another object of the present invention is to provide a foldable frame which has a simple construction that every individual is able to fold and unfold the foldable frame in one single motion.

Another object of the present invention is to provide a foldable frame which is adapted for being folded into a compact unit for easily storage and carriage.

Accordingly, in order to accomplish the above objects, the present invention provides a foldable frame for supporting a fabric thereon, comprising:

at least three pairs of frame legs each of which comprises a pair of first and second frame legs pivotally connected together where the first and second frame legs cross;

an upper frame joint for pivotally connecting top ends of the first frame legs;

a lower frame joint for pivotally connecting lower ends of the second frame legs wherein the lower frame joint is positioned below and aligning with the upper frame; and a coupling joint slidably connected between the upper frame joint and the lower frame joint for selectively adjusting a vertical distance therebetween, so as to regulate a tension of the fabric.

DETAILED DESCRIPTION OF THE PREFERRED EMBODIMENT

Figure 1:
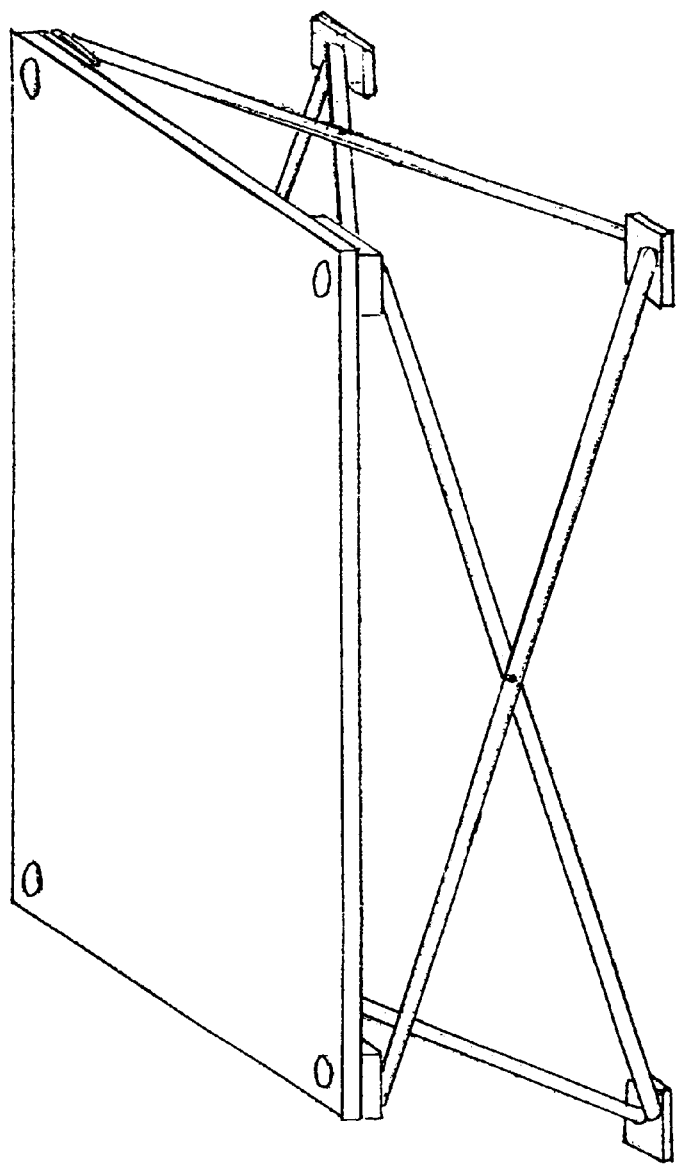
FIG. 1 is a perspective view of a conventional foldable frame.
Figure 2:
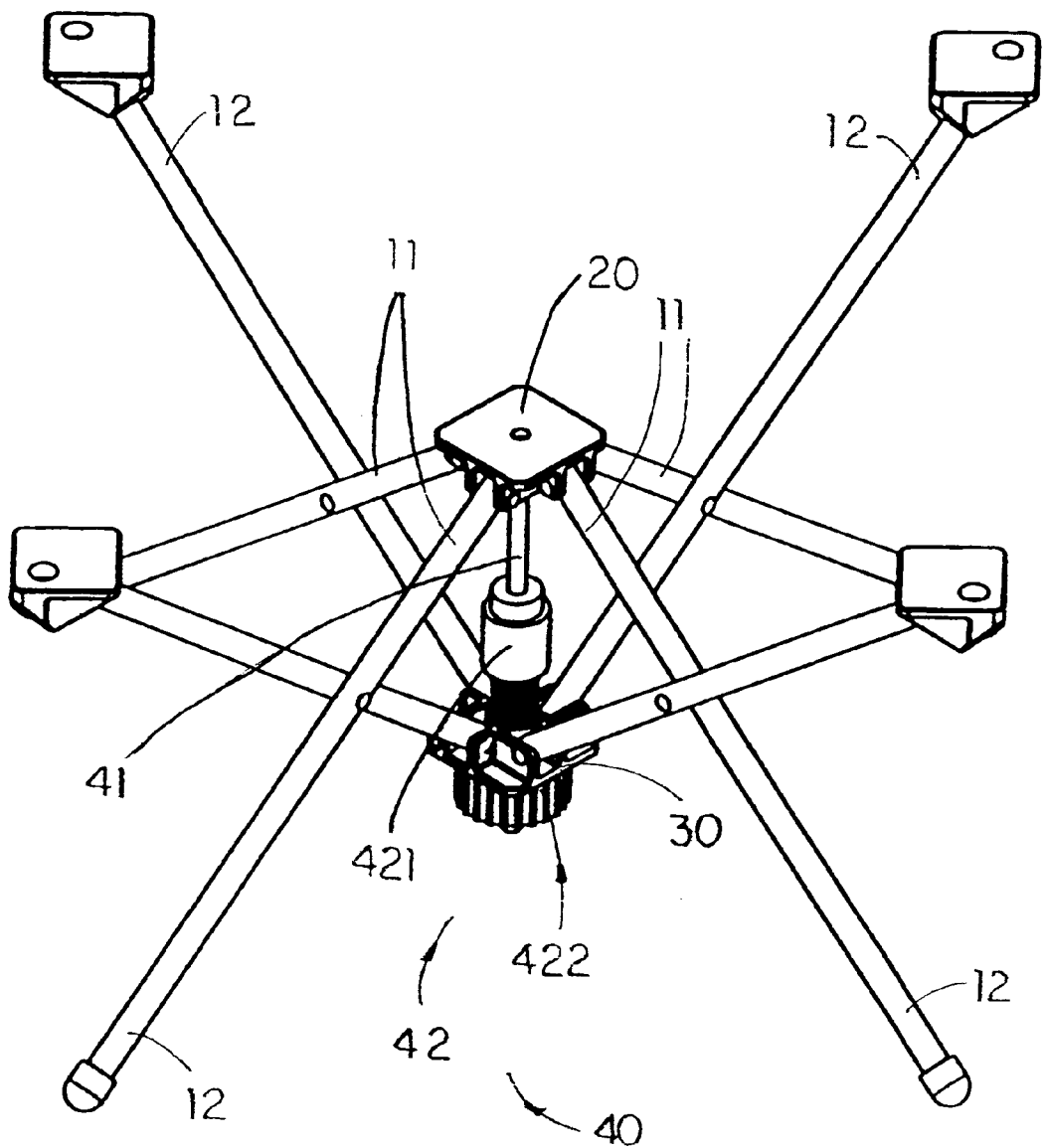
FIG. 2 is a perspective view of a foldable frame according to a preferred embodiment of the present invention.
Figure 3:
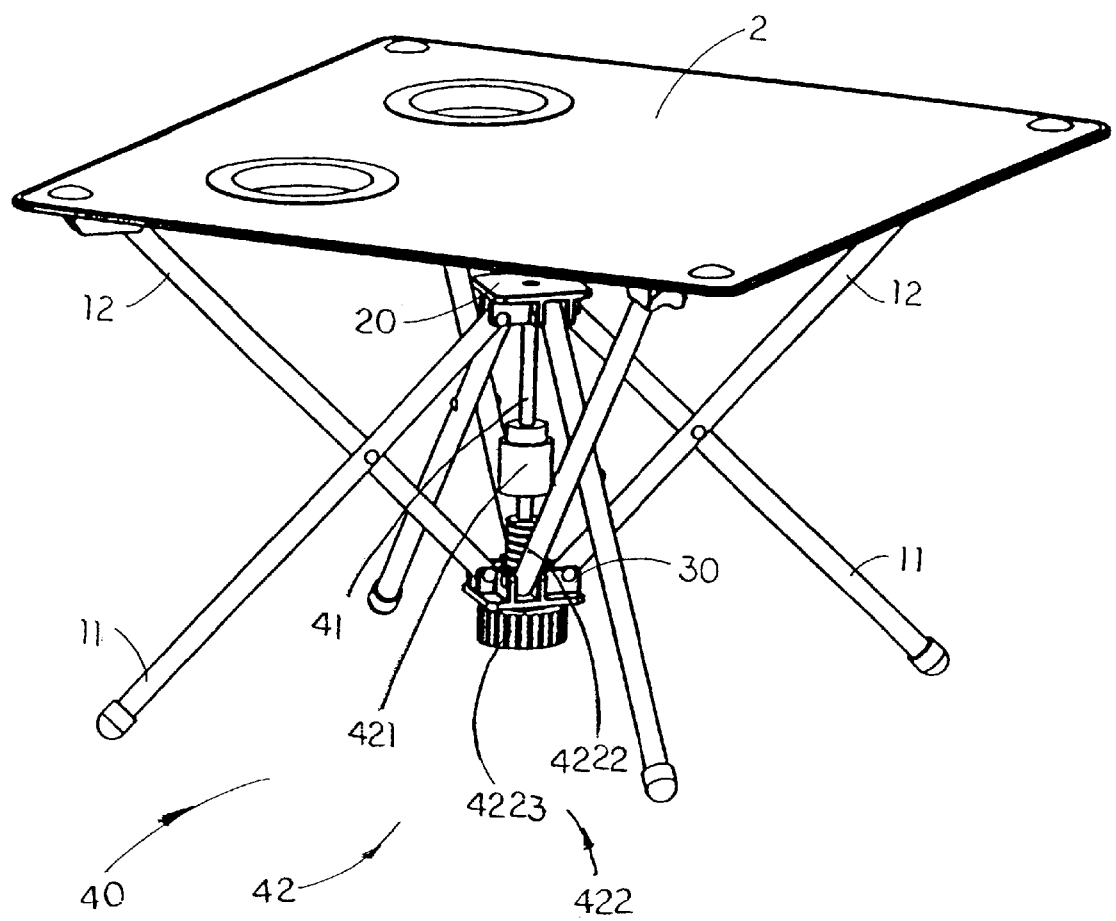
FIG. 3 is a perspective view of the foldable frame according to the above preferred embodiment of the present invention, illustrating a fabric being supported thereon.
Figure 4:
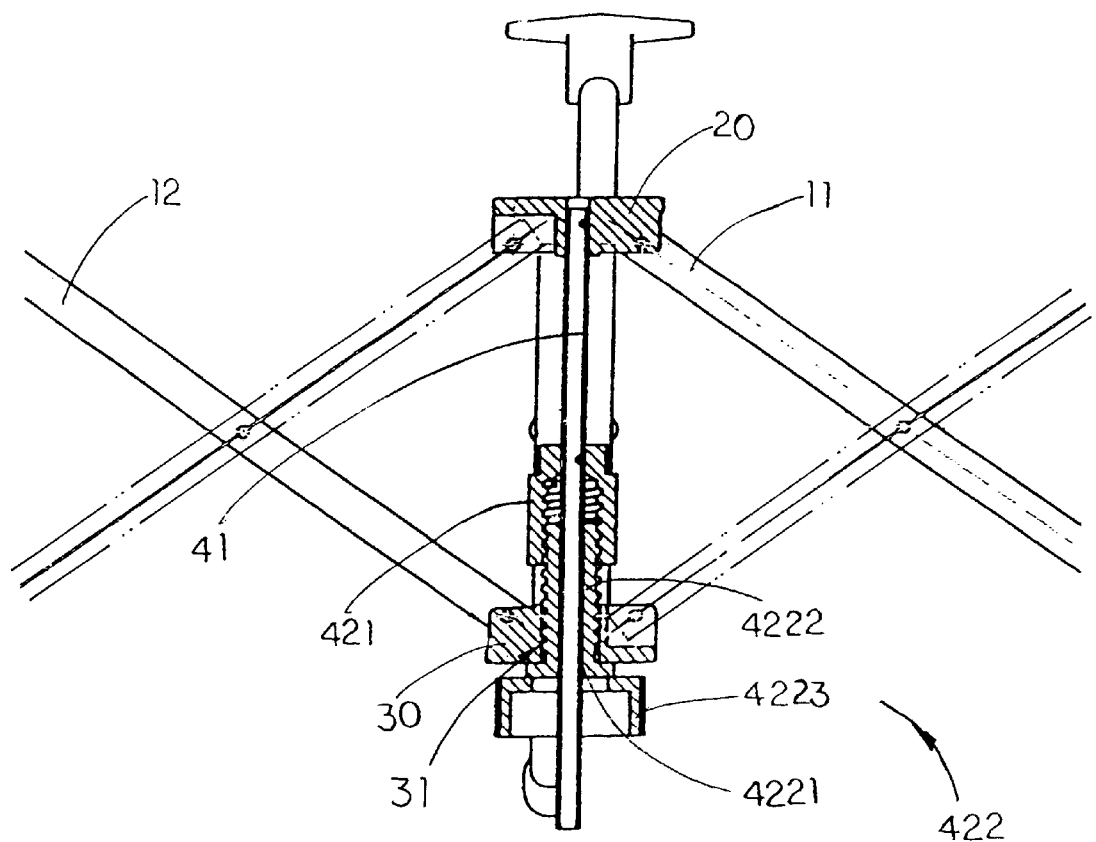
FIG. 4 is a sectional view of the foldable frame according to the above preferred embodiment of the present invention.

Referring to FIGS. 2 and 3 of the drawings, a foldable frame for supporting a fabric 2 thereon is illustrated. The foldable frame is adapted to be used as a foldable table or a foldable leg rest furniture. The foldable frame comprises at least three pairs of frame legs 10, an upper frame joint 20, a lower frame joint 30, and a coupling joint 40.

According to the preferred embodiment, the foldable frame comprises four pairs of frame legs 10 which are made of metal tubes wherein each pair of frame legs 10 comprises a pair of first and second frame legs 11, 12 pivotally connected together where the first and second frame legs 11, 12 cross.

The top ends of the first frame legs 11 are pivotally connected to the upper frame joint 20 respectively and the bottom ends of the second frame legs 12 are pivotally connected to the lower frame joint 30 respectively wherein the upper frame joint 20 is positioned above and aligning with the lower frame 30 in such a manner that the pairs of the frame legs 10 are radially connected together.

The coupling joint 40 is slidably connected between the upper frame joint 20 and the lower frame joint 30 for selectively adjusting a distance therebetween in a vertical manner, so as to regulate a tension of the fabric 2.

Figure 5:
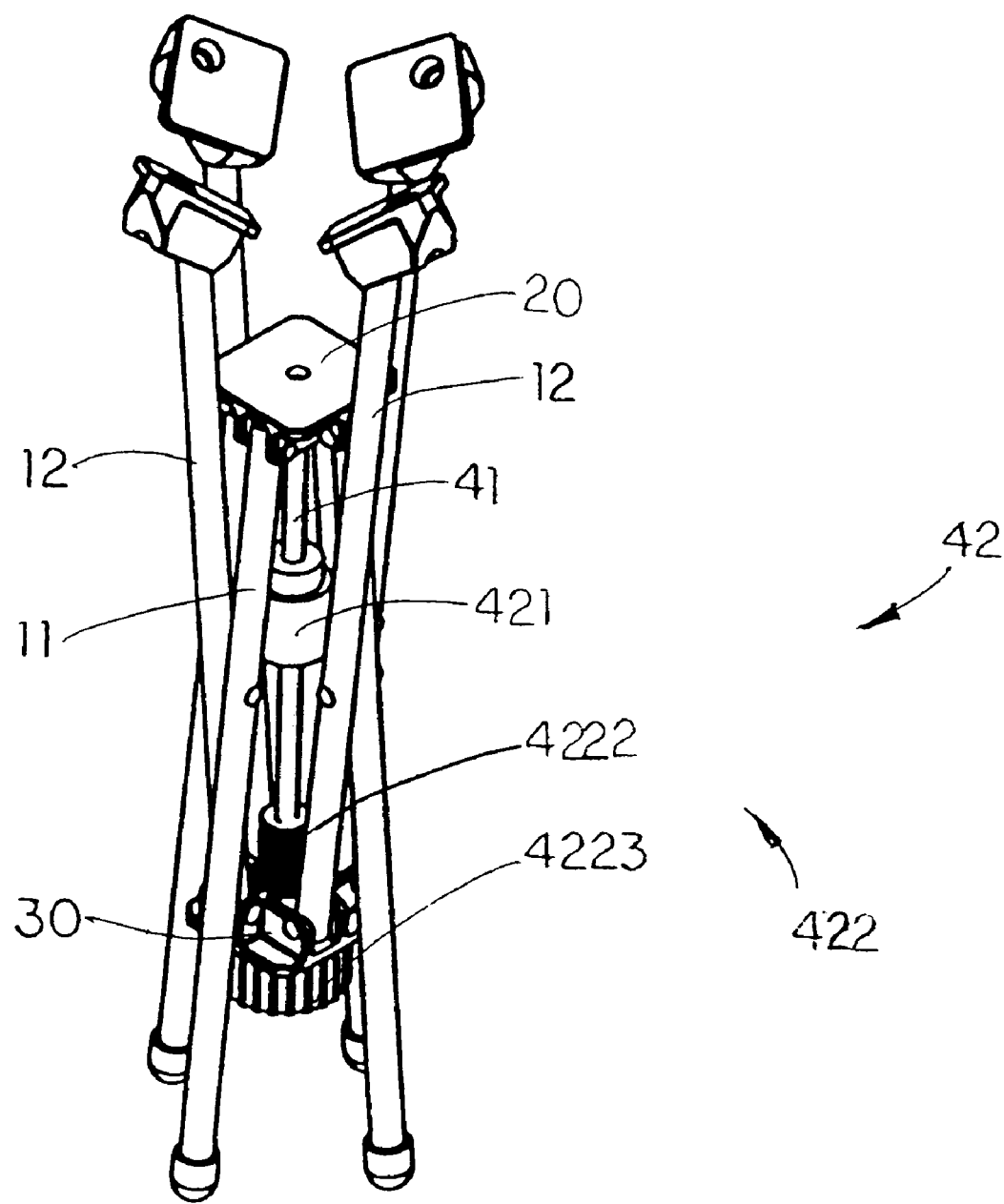
FIG. 5 is a perspective view of the foldable frame in a folded state according to the above preferred embodiment of the present invention.

As shown in FIG. 5, the coupling joint 40 comprises a slider axle 41 affixed to the upper frame joint 20 at a top end thereof and slidably connected to the lower frame joint 30 and an locker means 42 coaxially mounted on the slider axle 41 for selectively locking up the lower frame joint 30 on the slider axle 41 with a predetermined distance with respect to the upper frame joint 20.

Accordingly, the locker means 42 comprises a tubular holder 421 coaxially and selectively affixed to the slider axle 41 between the upper and lower joints 20, 30, and a locking latch 422 affixed to the lower frame joint 30 and slidably connected to the slider axle 41 adapted for securely locking with the locker holder 421, so as to selectively adjust the distance between the upper and lower frame joints 20, 30.

The tubular holder 421 comprises a holder head 4211 adapted for selectively affixing to the slider axle 41 by means of a pin 4212 in such a manner that the tubular holder 421 is adapted for adjusting the position along the slider axle 41 between the upper and lower frame joints 20, 30, so as to ensure the engagement between the locking latch 422 and the tubular holder 421.

The locking latch 422 of the locker means 42 has a center through hole 4221 for the slider axle 41 slidably passing therethrough, a latch body 4222 rotatably and vertically penetrating through the lower frame joint 30 adapted for rotatably engaging with the tubular holder 421, and an enlarged locker button 4223 integrally extended from a bottom end of the latch body 4222 for rotatably adjusting the distance between the upper and lower frame joints 20, 30. In order to engage the latch body 4222 of the locking latch 422 with the tubular holder 421, the latch body 4222 has an outer threaded portion for screwing with an inner threaded portion of the tubular holder 421 wherein the locker button 4223 is arranged to turn and drive the latch body 4222 rotatably screwed into the tubular holder 421 so as to shorten the distance between the upper and lower frame joints 20, 30.

The lower frame joint 30 has a center slider through hole 31 which diameter is slightly larger than the latch body 4222 of the locking latch 422 and transversally extended through the lower frame joint 30 for the latch body 4222 passing through.

Figure 6:
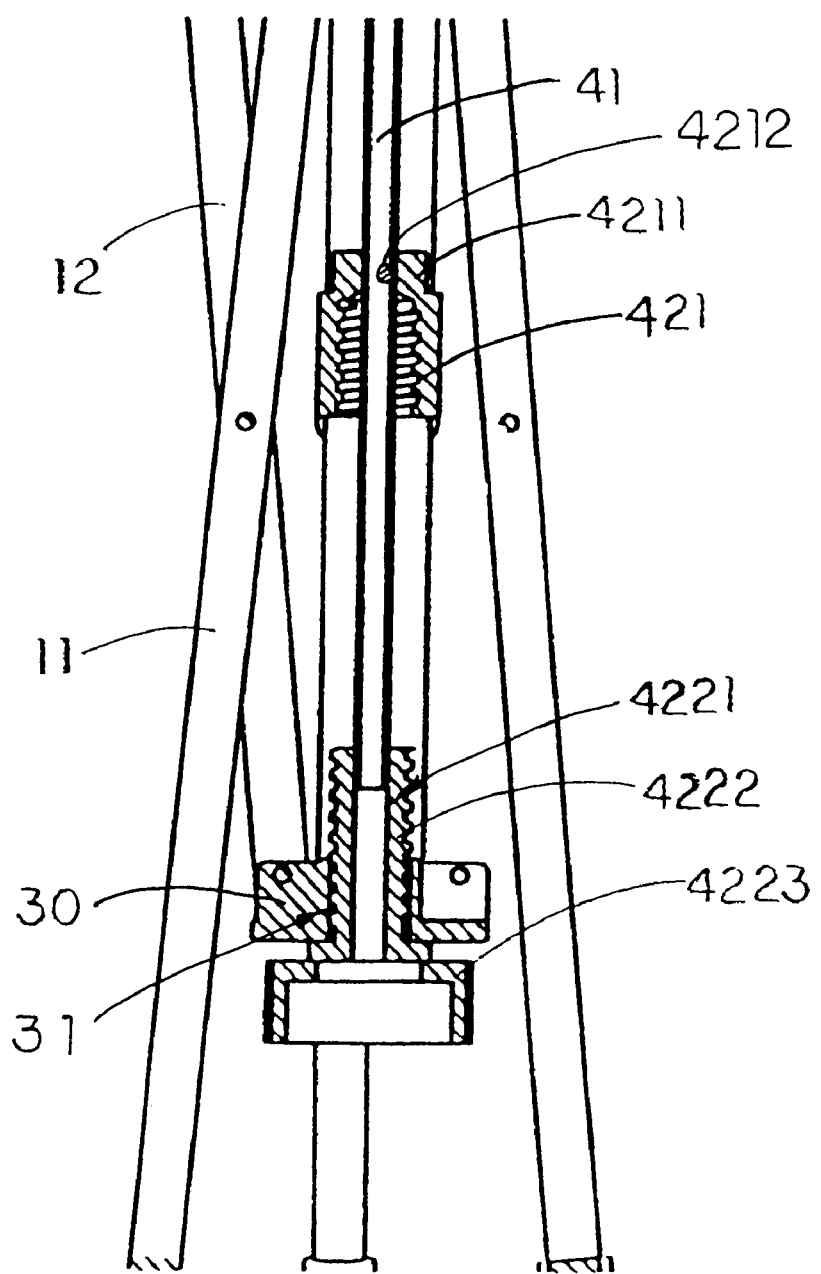
FIG. 6 is a sectional view of the foldable frame in a folded state according to the above preferred embodiment of the present invention.

When the foldable frame is folded, as shown in FIGS. 5 and 6, the first and second frame legs 11, 12 are opposedly rotated to near vertical position, as the circumference of the foldable frame is reduced and the height is lengthened. In other words, the upper and lower frame joints 20, 30 are slidably moved away from each other along the slider axle 41. Otherwise, to fold the foldable frame, the first and second frame legs 11, 12 are opposedly rotated in order to extend the circumference of the foldable frame, which will shorten its height. In such arrangement, the upper and lower frame joints 20, 30 are slidably moved towards each other, which will stretch the fabric 2 so as to increase the tension of the fabric 2. So, the adjustable locker means 42 can drive and lock up the lower frame joint 30 near to the upper frame 20 along the slider axle 41 and regulate the tension of the fabric 2.

Alternatively, the slider axle 41 of the coupling joint 40 is affixed to the upper frame joint 20 at a top end thereof and slidably connected to the lower frame joint 30 and an locker means 42 for selectively locking up the lower frame joint 30 on the slider axle with a predetermined distance with respect to the upper frame joint 20.

The locker means 42 can be a cylindrical locker button rotatably connected to the lower frame joint 30 wherein the locker means 42 is adapted for selectively locking the lower frame joint 30 on the slider axle 41. The locking means 42 may have an inner threaded portion for screwing with an outer threaded portion of the slider axle 41 in such a manner that the locker means 42 is adapted for slidably driving the lower frame joint 30 towards to the upper frame joint 20 along the slider axle 41 and selectively locking the lower frame joint 30 on the slider axle 41 with the predetermined distance with respect to the upper frame joint 20.

What is claimed is:

1. A foldable frame for supporting a fabric, comprising:
at least three pairs of frame legs each of which comprises a pair of first and second frame legs pivotally connected together where said first and second frame legs cross;
an upper frame joint for pivotally connecting top ends of said first frame legs;
a lower frame joint for pivotally connecting lower ends of said second frame legs wherein said lower frame joint is positioned below and vertically aligning with said upper frame; and
a coupling joint slidably connected between said upper frame joint and said lower frame joint for selectively adjusting a vertical distance therebetween, so as to regulate a tension of said fabric, wherein said coupling joint comprises a slider axle affixed to said upper frame joint at a top end thereof and slidably connected to said lower frame joint and a locker means coaxially mounted on said slider axle for selectively locking up said lower frame joint on said slider axle with a predetermined distance with respect to said upper frame joint, wherein said locker means comprises a tubular holder coaxially and vertically affixed to said slider axle between said upper and lower joints, and a locking latch affixed to said lower frame joint and slidably connected to said slider axle adapted for securely locking with said locker holder, so as to selectively adjust said distance between said upper and lower frame joints.

2. The foldable frame, as recited in claim 1, wherein said locking latch of said locking means has a center through hole for said slider axle, slidably passing therethrough, and a latch body rotatably and vertically penetrating through said lower frame joint adapted for rotatably engaging with said tubular holder.

3. The foldable frame, as recited in claim 2, wherein said locking means further comprises an enlarged locker button integrally extended from a bottom end of said latch body wherein said locker button is arranged to rotatably adjust said distance between said upper and lower frame joints.

4. The foldable frame, as recited in claim 2, wherein said latch body of said locking latch has an outer threaded portion for screwing with an inner threaded portion of said tubular holder.

5. The foldable frame, as recited in claim 3, wherein said latch body of said locking latch has an outer threaded portion for screwing with an inner threaded portion of said tubular holder.

6. The foldable frame, as recited in claim 2, wherein said tubular holder comprises a holder head selectively mounting on said slider axle in such a manner that said tubular holder is adapted for adjusting said position along said slider axle between said upper and lower frame joints, so as to ensure said engagement between said locking latch and said tubular holder.

7. The foldable frame, as recited in claim 3, wherein said tubular holder comprises a holder head selectively mounting on said slider axle in such a manner that said tubular holder is adapted for adjusting said position along said slider axle between said upper and lower frame joints, so as to ensure said engagement between said locking latch and said tubular holder.

8. The foldable frame, as recited in claim 5, wherein said tubular holder comprises a holder head selectively mounting on said slider axle in such a manner that said tubular holder is adapted for adjusting said position along said slider axle between said upper and lower frame joints, so as to ensure said engagement between said locking latch and said tubular holder.

9. The foldable frame, as recited in claim 2, wherein said lower frame joint has a center slider through hole which a diameter slightly larger than said latch body of said locking latch and transversally extended through said lower frame joint for said latch body passing through.

10. The foldable frame, as recited in claim 3, wherein said lower frame joint has a center slider through hole which a diameter slightly larger than said latch body of said locking latch and transversally extended through said lower frame joint for said latch body passing through.

11. The foldable frame, as recited in claim 5, wherein said lower frame joint has a center slider through hole which a diameter slightly larger than said latch body of said locking latch and transversally extended through said lower frame joint for said latch body passing through.

12. The foldable frame, as recited in claim 8, wherein said lower frame joint has a center slider through hole which a diameter slightly larger than said latch body of said locking latch and transversally extended through said lower frame joint for said latch body passing through.

* * * * *